Patented May 11, 1937

2,079,756

UNITED STATES PATENT OFFICE 2,079,756

ACID RESISTING COMPOSITION

Charles Rutland Barsby, Liverpool, and Harvey Richard Lyle Streight, Runcorn, England, assignors to Imperial Chemical Industries Limited, a corporation of Great Britain No Drawing. Application January 23, 1936, Serial No. 60,545. In Great Britain January 18, 1935

3 Claims. (Cl. 106—23)

This invention relates to improved acid resistant compositions for use in the construction of apparatus such as tanks and pipe lines for the storage and transport of acids, and acid liquors and gases.

It is well known to line metal tanks and pipes with soft and hard rubber compositions to render them suitable for the storage and transport of liquids, such as hydrochloric acid.

It is also known that chlorinated rubber is resistant to acids and proposals have been made to paint metal and other articles with solutions containing chlorinated rubber, with a view to providing protection against attack by acids and corrosive vapors. Coatings produced in this manner are, however, relatively thin and have a tendency to crack, even though plasticizers or softeners have been incorporated with the paint. Consequently they have not proved universally suitable for the protection of metal containers and the like intended for storage and transport of acid liquids under commercial conditions.

According to the present invention, a thick adherent acid-proof coating for metal or other rigid articles which possesses flexibility and a remarkable degree of freedom from cracking, comprises chlorinated rubber incorporated with one or more chlorinated wax-like hydrocarbons such as chlorinated paraffin wax and chlorinated naphthalene in suitable proportions.

As a further feature of the invention, such chlorinated rubber-chlorinated hydrocarbon mixtures are used in the production of acid-proof joints where an appreciable flexibility is required combined with gas tightness. Such constructions are, for example, joints made between contiguous pieces of earthenware, glass or silica ware used in hydrochloric acid coolers and absorbers. Such apparatus is used when water white acid is desired and the joints must have flexibility, in order to avoid risk of breakage occurring when temperature changes cause expansion and contraction. Gas tightness is obviously necessary, as is freedom from attack by the acid, particularly when any attack would yield soluble products liable to discolor the acid.

In preparing the coating material it is preferable to use a chlorinated rubber of high chlorine content, i. e. about 65% chlorine, as the stability of such preparations is much higher than those of low chlorine content. As the other major constituent of the coating, we prefer to use chlorinated paraffin wax having a chlorine content of about 45-50%. In general, a mixture containing equal weights of these two materials has been found to be suitable as a coating for metal ware, but variations in the proportions may be made according to the composition of the constituents and the conditions to which the material is to be subjected, such as temperature of use. We find, however, that it is preferable not to use more than about 60% chlorinated rubber, nor less than approximately 20%. Chlorinated naphthalene may also be added to the mixture with advantage where it is desired to stiffen the composition without robbing it of its plasticity, at least at elevated temperatures; preferably we use a chlorinated naphthalene containing about 55-60% chlorine. A chlorinated naphthalene of lower chlorine content may be used, but in such case the mixture has a greater degree of plasticity.

Thus a mixture of equal parts of chlorinated rubber and chlorinated paraffin wax is soft at normal temperatures and may be used as a luting or sealing composition for earthenware or silica up to about 40° C., while a mixture containing equal parts of chlorinated rubber, chlorinated paraffin wax, and chlorinated naphthalene, each of the preferred compositions hereinbefore described may be used at temperatures up to about 70° C., and is merely pliable at ordinary temperatures. However, if the chlorinated rubber comprises more than about 35% of the composition, it is preferable that the proportion of chlorinated naphthalene should not exceed the proportion of chlorinated paraffin wax, since difficulty is then experienced in incorporating the chlorinated rubber with the remaining constituents to form a homogeneous mix. Fibrous fillers, e. g. asbestos, may also be incorporated in amounts up to approximately 20%.

When incorporating the constituents of the coating, the chlorinated paraffin wax and/or chlorinated naphthalene are first melted and heated to about 150° C. and the chlorinated rubber in finely divided form is then added slowly while maintaining a constant and thorough agitation of the mass. Preferably a small proportion of a base, e. g. up to 5% of lime or chalk, is added before incorporating the chlorinated rubber, in order to neutralize any acidity which might develop through slight decomposition of the latter at the temperatures used. The mixing may conveniently be completed by milling the material, or by passing it several times through heated rollers. After mixing is complete, the hot mass which passes through a very sticky stage during cooling, may be applied directly to the metal article and then smoothed into position by a hot trowel or similar instrument. Alternatively, the cooled mass may be rolled on to heated metal sheets which are subsequently bolted together to form a storage tank. The composition can then, if desired, be heated locally, e. g. by a blow lamp, and worked with a trowel to render its surface continuous. We do not find that any special precautions are necessary to secure good adhesion between metal and composition beyond the customary cleaning which would normally be undertaken, though the cleaned surface may with advantage be sprayed with a solution of chlorinated rubber in carbon tetrachloride and the like.

When using the compositions for acid-proof joints and the like, it may be applied in a similar manner while in a plastic state, and worked into position with a trowel etc.

The following examples are illustrative of compositions applicable for use according to the present invention, all parts being by weight.

Example 1

100 parts of chlorinated paraffin wax containing 45% chlorine and 100 parts chlorinated naphthalene containing 58% chlorine, were melted together and heated to about 145° C. 5 parts of powdered chalk were then stirred in and 100 parts of chlorinated rubber (65% chlorine) in a finely divided condition were added, agitation being maintained until the mix became uniform. The compositions were of a pliable consistency at room temperature and were suitable for use as a luting or jointing material for pipes up to about 80° C.

Example 2

A mixture was prepared as in Example 1 from 200 parts of chlorinated paraffin wax (52% chlorine), 100 parts chlorinated naphthalene (58% chlorine) and 100 parts chlorinated rubber (65% chlorine). The product was quite firm at ordinary temperatures, and proved suitable as a lining for metal containers for hydrochloric acid solutions.

As many apparent and widely different embodiments of this invention may be made without departing from the spirit and scope thereof, it is to be understood that we do not limit ourselves to the specific embodiments thereof except as defined in the appended claims.

We claim:

1. An adherent, thermoplastic, acid-resistant composition possessing some flexibility and freedom from tendency to crack adapted for luting and jointing comprising highly stable chlorinated rubber, chlorinated paraffin wax and chlorinated naphthalene, the chlorinated rubber being highly chlorinated such as that containing 65% chlorine, the chlorinated paraffin having a chlorine content in the range of 45% to 52%, the chlorinated rubber constituting about 20% to 60% of the total amount of the chlorinated rubber and chlorinated paraffin, the chlorinated naphthalene being present in an amount sufficient to give the composition the desired stiffness and plasticity, the amount of chlorinated naphthalene not exceeding the amount of chlorinated paraffin wax when the chlorinated rubber comprises more than about 35% of the composition.

2. The material of claim 1 in which has been incorporated a fibrous filler in an amount not exceeding 20%.

3. An adherent, thermoplastic, acid-resistant composition possessing some flexibility and freedom from tendency to crack adapted for luting and jointing comprising highly stable chlorinated rubber, chlorinated paraffin wax and chlorinated naphthalene, the chlorinated rubber being highly chlorinated such as that containing 65% chlorine, the chlorinated paraffin having a chlorine content in the range of 45% to 52%, and the chlorinated naphthalene having a chlorine content in the range of 55% to 60%, the chlorinated rubber constituting about 20% to 60% of the total amount of the chlorinated rubber and chlorinated paraffin, the chlorinated naphthalene being present in an amount sufficient to give the composition the desired stiffness and plasticity, the amount of chlorinated naphthalene not exceeding the amount of chlorinated paraffin wax when the chlorinated rubber comprises more than about 35% of the composition.

CHARLES RUTLAND BARSBY.
HARVEY RICHARD LYLE STREIGHT.